US010318923B1

(12) United States Patent
MacLeod

(10) Patent No.: US 10,318,923 B1
(45) Date of Patent: Jun. 11, 2019

(54) PAYMENT ASSURANCE AND CLAIM PRE-VALIDATION

(75) Inventor: David MacLeod, Denver, CO (US)

(73) Assignee: Cognizant TriZetto Software Group, Inc., Englewood, CO (US)

( * ) Notice: Subject to any disclaimer, the term of this patent is extended or adjusted under 35 U.S.C. 154(b) by 867 days.

(21) Appl. No.: 13/564,047

(22) Filed: Aug. 1, 2012

(51) Int. Cl.
G06Q 10/10 (2012.01)
(52) U.S. Cl.
CPC .................................. G06Q 10/10 (2013.01)
(58) Field of Classification Search
None
See application file for complete search history.

(56) References Cited

U.S. PATENT DOCUMENTS

| 4,491,725 | A | 1/1985 | Pritchard ........................... 705/2 |
| 4,831,526 | A | 5/1989 | Luchs et al. .................. 364/401 |
| 4,858,121 | A | 8/1989 | Barber et al. ...................... 705/2 |
| 4,916,611 | A | 4/1990 | Doyle, Jr. et al. ............ 364/401 |
| 4,987,538 | A | 1/1991 | Johnson et al. .............. 364/401 |
| 5,070,452 | A | 12/1991 | Doyle, Jr. et al. ............ 364/401 |
| 5,134,564 | A | 7/1992 | Dunn et al. ..................... 705/33 |
| 5,191,522 | A | 3/1993 | Bosco et al. .................. 364/401 |
| 5,202,827 | A | 4/1993 | Sober ........................... 364/408 |
| 5,225,976 | A | 7/1993 | Tawil ........................... 364/401 |
| 5,235,507 | A | 8/1993 | Sackler et al. .................... 705/2 |
| 5,235,702 | A | 8/1993 | Miller ........................... 395/600 |
| 5,253,164 | A | 10/1993 | Holloway et al. ................ 705/2 |
| 5,301,105 | A | 4/1994 | Cummings, Jr. .................. 705/2 |
| 5,324,077 | A | 6/1994 | Kessler et al. .................. 283/54 |
| 5,325,290 | A | 6/1994 | Cauffman et al. ............ 364/401 |
| 5,333,317 | A | 7/1994 | Dann | |
| 5,339,434 | A | 8/1994 | Rusis ........................... 395/700 |

(Continued)

FOREIGN PATENT DOCUMENTS

DE 19641357 9/1998 ............. G06F 17/60
JP H 11242270 9/1999 ............. G03B 15/05
(Continued)

OTHER PUBLICATIONS

U.S. Appl. No. 10/923,539, filed Aug. 20, 2004, Hensley.
(Continued)

Primary Examiner — Linh Giang Le
(74) Attorney, Agent, or Firm — Dawn-Marie Bey; Bey & Cotropia PLLC

(57) ABSTRACT

Methods and systems for payment assurance and claim pre-validation are described. In one embodiment, a pre-visit claim for health care related services is received for payment assurance. In response to the pre-visit claim, a payer is queried for pre-visit claim detail information indicating any payment or authorization issues for services to be rendered. The pre-visit claim may be updated in certain embodiments based on the pre-visit claim detail information, and an appointment may be scheduled for services. In other aspects, a claim for health care related services is received for pre-validation. In response, a payer is queried for claim detail information indicating any payment or authorization issues for the claim. The claim may be updated in certain embodiments based on the claim detail information, and payment for services rendered may be provided by a payer in response to a submitted claim.

7 Claims, 16 Drawing Sheets

(56) References Cited

U.S. PATENT DOCUMENTS

| | | | |
|---|---|---|---|
| 5,359,509 A | 10/1994 | Little et al. ............... 705/2 |
| 5,410,675 A | 4/1995 | Shreve et al. ............... 395/500 |
| 5,471,382 A | 11/1995 | Tallman et al. ............... 600/300 |
| 5,493,671 A | 2/1996 | Pitt et al. ............... 395/500 |
| 5,517,405 A | 5/1996 | McAndrew et al. ............... 706/45 |
| 5,519,607 A | 5/1996 | Tawil ............... 364/401 |
| 5,523,942 A | 6/1996 | Tyler et al. ............... 364/401 |
| 5,539,787 A | 7/1996 | Nakano et al. ............... 375/377 |
| 5,544,044 A | 8/1996 | Leatherman ............... 705/3 |
| 5,560,008 A | 9/1996 | Johnson et al. ............... 395/650 |
| 5,581,558 A | 12/1996 | Horney, II et al. ............... 370/401 |
| 5,583,760 A | 12/1996 | Klesse ............... 705/38 |
| 5,644,778 A | 7/1997 | Burks et al. ............... 705/2 |
| 5,692,501 A | 12/1997 | Minturn ............... 600/301 |
| 5,696,906 A | 12/1997 | Peters et al. ............... 395/234 |
| 5,704,044 A | 12/1997 | Tarter et al. ............... 705/4 |
| 5,708,828 A | 1/1998 | Coleman ............... 395/785 |
| 5,715,397 A | 2/1998 | Ogawa et al. ............... 395/200.18 |
| 5,724,379 A | 3/1998 | Perkins et al. ............... 705/2 |
| 5,737,539 A | 4/1998 | Edelson et al. ............... 395/203 |
| 5,793,771 A | 8/1998 | Darland et al. ............... 370/467 |
| 5,794,221 A | 8/1998 | Egendorf ............... 705/40 |
| 5,815,689 A | 9/1998 | Shaw et al. ............... 395/551 |
| 5,832,447 A | 11/1998 | Rieker et al. ............... 705/2 |
| 5,832,460 A | 11/1998 | Bednar et al. ............... 705/27 |
| 5,835,897 A | 11/1998 | Dang ............... 705/2 |
| 5,845,254 A | 12/1998 | Lockwood et al. ............... 705/2 |
| 5,852,812 A | 12/1998 | Reeder ............... 705/39 |
| 5,879,163 A | 3/1999 | Brown et al. ............... 434/236 |
| 5,890,129 A | 3/1999 | Spurgeon ............... 705/4 |
| 5,903,873 A | 5/1999 | Peterson et al. ............... 705/4 |
| 5,907,490 A | 5/1999 | Oliver ............... 364/468.05 |
| 5,911,132 A | 6/1999 | Sloane ............... 705/3 |
| 5,915,241 A | 6/1999 | Giannini ............... 705/2 |
| 5,920,847 A | 7/1999 | Kolling et al. ............... 705/40 |
| 5,924,074 A | 7/1999 | Evans ............... 705/3 |
| 5,930,759 A | 7/1999 | Moore et al. ............... 705/2 |
| 5,950,168 A | 9/1999 | Simborg et al. ............... 705/3 |
| 5,950,169 A | 9/1999 | Borghesi et al. ............... 705/4 |
| 5,970,463 A | 10/1999 | Cave et al. ............... 705/3 |
| 5,974,389 A | 10/1999 | Clark et al. ............... 705/3 |
| 5,991,733 A | 11/1999 | Aleia et al. ............... 705/8 |
| 5,991,876 A | 11/1999 | Johnson et al. ............... 713/200 |
| 5,995,939 A | 11/1999 | Berman et al. ............... 705/3 |
| 6,003,007 A | 12/1999 | DiRienzo ............... 705/4 |
| 6,012,035 A | 1/2000 | Freeman, Jr. et al. ............... 705/2 |
| 6,044,362 A | 3/2000 | Neely ............... 705/34 |
| 6,047,259 A | 4/2000 | Campbell et al. ............... 705/3 |
| 6,052,524 A | 4/2000 | Pauna ............... 395/500.43 |
| 6,052,674 A | 4/2000 | Zervides et al. ............... 705/40 |
| 6,088,677 A | 7/2000 | Spurgeon ............... 705/4 |
| 6,092,055 A | 7/2000 | Owens et al. ............... 705/34 |
| 6,094,684 A | 7/2000 | Pallmann ............... 709/227 |
| 6,111,893 A | 8/2000 | Volftsun et al. ............... 370/466 |
| 6,112,183 A | 8/2000 | Swanson et al. ............... 705/2 |
| 6,151,581 A | 11/2000 | Kraftson et al. ............... 705/3 |
| 6,163,770 A | 12/2000 | Gamble et al. ............... 705/4 |
| 6,199,115 B1 | 3/2001 | DiRienzo ............... 709/236 |
| 6,208,973 B1 | 3/2001 | Boyer et al. ............... 705/2 |
| 6,208,974 B1 | 3/2001 | Campbell et al. ............... 705/3 |
| 6,226,658 B1 | 5/2001 | Smith ............... 707/517 |
| 6,253,186 B1 | 6/2001 | Pendleton, Jr. ............... 705/2 |
| 6,283,761 B1 | 9/2001 | Joao ............... 434/236 |
| 6,285,991 B1 | 9/2001 | Powar ............... 705/76 |
| 6,304,857 B1 | 10/2001 | Heindel et al. ............... 705/34 |
| 6,324,516 B1 | 11/2001 | Shults et al. ............... 705/2 |
| 6,341,265 B1 | 1/2002 | Provost et al. ............... 705/4 |
| 6,343,271 B1 | 1/2002 | Peterson et al. ............... 705/4 |
| 6,345,260 B1 | 2/2002 | Cummings, Jr. et al. ............... 705/8 |
| 6,374,229 B1 | 4/2002 | Lowrey et al. ............... 705/34 |
| 6,453,297 B1 | 9/2002 | Burks et al. ............... 705/3 |
| 6,529,876 B1 | 3/2003 | Dart et al. ............... 705/4 |
| 6,542,905 B1 | 4/2003 | Fogel et al. ............... 707/200 |
| 6,587,829 B1 | 7/2003 | Camarda et al. ............... 705/3 |
| 6,618,808 B1 | 9/2003 | Johnson et al. ............... 713/200 |
| 6,658,630 B1 | 12/2003 | Threatt et al. ............... 716/3 |
| 6,665,685 B1 | 12/2003 | Bialic ............... 707/102 |
| 6,735,569 B1 | 5/2004 | Wizig ............... 705/4 |
| 6,757,898 B1 | 6/2004 | Ilsen et al. ............... 718/203 |
| 6,763,346 B1 | 7/2004 | Nishida et al. ............... 707/2 |
| 6,879,959 B1 | 4/2005 | Chapman et al. ............... 705/2 |
| 6,915,265 B1 | 7/2005 | Johnson ............... 705/2 |
| 6,947,907 B1 | 9/2005 | Silverman ............... 705/40 |
| 7,016,856 B1 | 3/2006 | Wiggins ............... 705/2 |
| 7,194,416 B1 | 3/2007 | Provost et al. ............... 705/4 |
| 7,344,496 B2 | 3/2008 | Iliff ............... 600/300 |
| 7,346,522 B1 | 3/2008 | Baylor et al. ............... 705/3 |
| 7,389,245 B1 | 6/2008 | Ashford et al. ............... 705/2 |
| 7,464,040 B2 | 12/2008 | Joao ............... 705/2 |
| 7,774,252 B2 | 8/2010 | Seare et al. ............... 705/35 |
| 7,904,317 B1 | 3/2011 | Lesswing et al. ............... 705/4 |
| 8,099,302 B2 | 1/2012 | Chapman et al. ............... 705/2 |
| 8,494,876 B2 | 7/2013 | Chapman et al. ............... 705/2 |
| 2002/0004725 A1 | 1/2002 | Martin et al. ............... 705/2 |
| 2002/0019754 A1 | 2/2002 | Peterson et al. ............... 705/4 |
| 2002/0046165 A1 | 4/2002 | Kitchen et al. ............... 705/40 |
| 2002/0049617 A1 | 4/2002 | Lencki et al. ............... 705/4 |
| 2002/0077854 A1 | 6/2002 | Porterfield ............... 705/2 |
| 2002/0077869 A1 | 6/2002 | Doyle et al. ............... 705/4 |
| 2002/0138304 A1 | 9/2002 | Fontanesi ............... 705/2 |
| 2002/0178120 A1 | 11/2002 | Reid et al. ............... 705/59 |
| 2002/0194008 A1 | 12/2002 | Yang et al. ............... 705/1 |
| 2003/0023466 A1 | 1/2003 | Harper ............... 705/7 |
| 2003/0033162 A1 | 2/2003 | Houssiaux et al. ............... 705/1 |
| 2003/0033240 A1 | 2/2003 | Balson et al. ............... 705/37 |
| 2003/0046093 A1 | 3/2003 | Erickson et al. ............... 705/1 |
| 2003/0046116 A1 | 3/2003 | Horowitz et al. ............... 705/4 |
| 2003/0055679 A1 | 3/2003 | Soll et al. ............... 705/2 |
| 2003/0061174 A1 | 3/2003 | Menninger ............... 705/400 |
| 2003/0084004 A1 | 5/2003 | Morciniec et al. ............... 705/80 |
| 2003/0097329 A1 | 5/2003 | Nabe et al. ............... 705/38 |
| 2003/0115156 A1 | 6/2003 | Baker ............... 705/400 |
| 2003/0212582 A1 | 11/2003 | Taschner ............... 705/4 |
| 2004/0024683 A1 | 2/2004 | Morciniec et al. ............... 705/37 |
| 2004/0034607 A1 | 2/2004 | Piccinelli ............... 705/80 |
| 2004/0064386 A1 | 4/2004 | Goguen et al. ............... 705/34 |
| 2004/0083119 A1 | 4/2004 | Schunder et al. ............... 705/1 |
| 2004/0085355 A1 | 5/2004 | Harmes et al. ............... 345/751 |
| 2005/0033609 A1 | 2/2005 | Yang ............... 705/2 |
| 2005/0091143 A1 | 4/2005 | Schmidt et al. ............... 705/37 |
| 2005/0108067 A1* | 5/2005 | Chapman et al. ............... 705/4 |
| 2005/0187797 A1 | 8/2005 | Johnson ............... 705/3 |
| 2005/0247777 A1 | 11/2005 | Pitroda ............... 235/380 |
| 2006/0085311 A1 | 4/2006 | Hoerle et al. ............... 705/35 |
| 2007/0203834 A1 | 8/2007 | Field ............... 705/40 |
| 2008/0033750 A1* | 2/2008 | Burriss et al. ............... 705/2 |
| 2010/0235197 A1 | 9/2010 | Dang ............... 705/3 |
| 2012/0109681 A1 | 3/2012 | Chapman et al. ............... 705/2 |

FOREIGN PATENT DOCUMENTS

| | | | | |
|---|---|---|---|---|
| JP | H 11242701 A | 9/1999 | ............ G06F 19/00 |
| JP | 2001-175724 A | 6/2001 | ............ G06F 19/00 |
| WO | WO 84/01448 | 4/1984 | ............ G06Q 40/00 |
| WO | WO 91/15817 | 10/1991 | ............ G06F 12/00 |
| WO | WO 95/03569 | 2/1995 | ............ G06Q 40/00 |
| WO | WO 95/12857 | 5/1995 | ............ G06Q 17/60 |
| WO | WO 99/22330 | 5/1999 | ............ G06F 19/00 |
| WO | WO 99/44111 | 9/1999 | ............ G06Q 20/00 |
| WO | WO 00/03343 | 1/2000 | ............ G06F 19/00 |
| WO | WO 00/66367 | 11/2000 | ............ B42D 1/10 |
| WO | WO 00/67173 A1 | 11/2000 | ............ G06Q 30/00 |

OTHER PUBLICATIONS

U.S. Appl. No. 09/577,386, filed May 23, 2000, Lesswing et al.

"National Health Plan Identifier, The Establishment of a Standard for a National Health Plan Identifier Issue Paper" [online], Mar. 11, 1998 [retrieved on Dec. 14, 2010], 13 pp., Retrieved from the Internet: http://www.payorid.com/Medicare/HIPAA.htm.

Kirby, Williams H., Jr., "Computer-Based Applications for Providers, Consumers and Insurers in Health Care Services and Education," IEEE, pp. 236-242, 1982.

(56) References Cited

OTHER PUBLICATIONS

North Carolina, Industrial Commission, Memorandum, "New Mandatory Medical Billing and Reimbursement Procedures," 2 pp., Nov. 30, 1999.
DownSeeker Scripts, "Free Download MedLink Script," 2 pp., Aug. 29, 1999.
The Free Library, "HNC Insurance Solutions Introduces Autoadvisor, the First Integrated Medical Repricing Software With Managed Care Component for the Auto Medical Claims Market" [online], Business Wire, Sep. 2, 1998 [retrieved on Dec. 14, 2010], 4 pp., Retrieved from the Internet: http://www.thefreelibrary.com/HNC+Insurance+Sol . . . .
Selby, Dayton W. and Federico, Robert J., "The Effects of Physicians' Computer Applications on Health Insurance Claims and Reimbursements," IEEE, pp. 746-751, 1979.
Miller, Lawrence G., "Reducing Health Care Costs Using Claims Adjudication Software" [online], Physician Executive, May 1, 1993 [retrieved on Dec. 14, 2010], 4 pp., Retrieved from the Internet: http://www.thefreelibrary.com/Reducing+Health+ca . . . .
Waterhouse, Rosie, "Medical Tests for New Benefit 'Unfair': Over-Reliance on Health Evidence Attacked" [online], The Independent, Feb. 17, 1994 [retrieved on Dec. 20, 2010], 1 p., Retrieved from the Internet: http://www.independent.co.uk/news/uk/politics/medical-tests-for-new-benefit-unfair-overreliance-on-healt . . . .
Press Release, "TriZetto Introduces NetworX Modeler" [online], Nov. 18, 2003 [retrieved on Apr. 18, 2011], 2 pp., Retrieved from the Internet: http://www.trizetto.com/newsEvents/pressReleases/2003-11-18_NetworXModeler.asp.
IBM, Solutions for Healthcare Management, "TriZetto NetworX and IBM: Driving Costs Out of Healthcare Management," 2 pp., Copyright 2009.
The Gantry Group, "ROI Value Delivery Through Streamlined Provider Contract Modeling" [online], [retrieved on Apr. 18, 2011], 1 p., Retrieved from the Internet: http://www.gantrygroup.com/healthcare/research/detail.cfm?product_id=561.
"Healthcare Solutions: Health Plans—NetworX Pricer" [online], Copyright 2000-2011 [retrieved on Apr. 18, 2011], 1 p., Retrieved from the Internet: http://www.trizetto.com/hpSolutions/networXPricer.asp.
EHealthPartners, "TriZetto NetworX Pricer™ & Modeler™" [online], [retrieved on Apr. 18, 2011], 1 p., Retrieved from the Internet: http://www.ehealthpartners.com/Applications/ApplicationExpertise/TriZettoNetworXPrice . . . .
White Paper, "The Gantry Group: Is TriZetto® NetworX Modeler® Delivering on its ROI Promise?," Copyright 2010, 8 pp.
"Preferred Care Partners Selects TriZettos Facets Software and Specialized Components to . . . ", Business Wire, May 26, 2005, 2 pp.
"CareSource Selects TriZetto's CareAdvance Enterprise Software and Specialized Components to Help It Administer Medicaid Business" [online], Business Wire, 2 pp., Sep. 5, 2006 [retrieved on Apr. 18, 2011], Retrieved from the Internet: http://www.medinfonewa.com/ar/1r.htm.
"CareFirst BlueCross BlueShield Selects TriZetto's NetworX Pricer Software to Automate Claims Pricing and Help Manage Costs" [online], Sep. 21, 2006 [retrieved on Apr. 18, 2011], 1 p., Retrieved from the Internet: http://goliath.ecnext.com/coms2/gi_0199-5783145/careFirst-BlueCross-BlueShield-Select . . . .
"Blue Shield of California Launches Work on System-Wide Technology Upgrade With TriZetto's Facets Software" [online], Jan. 29, 2008 [retrieved on Apr. 18, 2011], 1 p., Retrieved from the Internet: https://www.blueshieldca.com/bsc/newsroom/pr/Legacy/Modernization_012908.jhtml.
"Blue Cross and Blue Shield of Minnesota Will Use TriZetto's NetworX Suite to Move Toward Value-Based Reimbursement Models" [online], Business Wire, May 11, 2010 [retrieved on April 18, 2011], 2 pp., Retrieved from the Internet: http://www.businesswire.com/news/home/20100511005321/en/Blue-Cross-Blue-Shield-M . . . .
"Patient-Centered Primary Care Collaborative, Commonwealth Fund, Dartmouth Institute Release Landmark Consensus Document on ACOs, Medical Homes" [online], Apr. 12, 2011 [retrieved on Jun. 7, 2011], EMR and Health IT News, 9 pp., Retrieved from the Internet: http://www.emrandhipaa.com/news/2011/04/12/patient-centered-primary-care-collaborative-commonwealth-fund-dartmouth-institute-release-landmark-consensus-document-on-acos-medical-homes.
Feucht, Daniel Francis, et al., "Session # 46 PD: ICD-10: Implications on Pricing, Reserving, IT and Strategy," Society of Actuaries, SOA '10 Health Meeting, Jun. 28-30, 2010, 27 pp.
"ICD-10-CM-PCS MS-DRG Conversion Project, ICD-9-CM Coordination & Maintenance Committee," Centers for Medicare & Medicaid Services, Sep. 16, 2009, 74 pp.
"Repricing Window," The TriZetto Group, Inc., ClaimBatch Entry-CBE, Section 8—Adding Other Information, 12 pp.
Contract Management Solutions, "Company Overview" [online], Retrieved on Aug. 3, 2004, Retrieved from: http://www.cmsi.com/company, 1 p.
Contract Management Solutions, "Solutions Overview" [online], Retrieved on Aug. 3, 2004, Retrieved from: http://www.cmsi.com/solutions, 1 p.
Dicarta Enterprise Contract Management, Management, "Products" [online], Retrieved on Aug. 3, 2004, Retrieved from: http://www.dicarta.com/html/products, 9 pp.
Contract Management Solutions, "Contract Manager" [online], Retrieved on Aug. 3, 2004, Retrieved from: http://www.cmsi.com/solutions/cm.htm, 3 pp.
Contract Management Solutions, "Deal Manager" [online], Retrieved on Aug. 3, 2004, Retrieved from: http://www.cmsi.com/solutions.dm.htm. 1 p.
Contract Management Solutions, "Technology" [online], Retrieved on Aug. 3, 2004, Retrieved from: http://www.cmsi.com/solutions/tech.htm, 1 p.
Dicarta Enterprise Contract Management, "Healthcare" [online], Retrieved on Aug. 3, 2004, Retrieved from: http://www.dicarta.com/html/products/healthcare.cfm, 2 pp.
Contract Management Solutions, "Compliance" [online], Retrieved on Aug. 3, 2004, Retrieved from: http://www.cmsi.com/solutions/cmxc.htm, 1 p.
International Search Report and Written Opinion issued for PCT/US2005/036971, dated Dec. 26, 2006.
International Search Report and Written Opinion issued for PCT/US2007/070298, dated Jan. 7, 2008, pp. 1-11.
Gustafson, Bobette M., "Preparing for Future Roles as Claims Payers" [online], Healthcare Financial Management, Jan. 1, 1996 [retrieved on Dec. 14, 2010], 3 pp., Retrieved from the Internet: http://www.allbusiness.com/.../538143-1.html.
Contract Management Solutions, "CMXchange" [online], Retrieved on Aug. 3, 2004, Retrieved from: http://www.cmsi.com/solutions.cmxe.htm, 1 p.

* cited by examiner

PAYMENT ASSURANCE AND CLAIM PRE-VALIDATION

BACKGROUND

In today's healthcare delivery model, an industry gap exists between payers, the organizers of benefit and payment systems, providers, responsible for the hands on delivery of care, and patients. Although certain aspects of the healthcare delivery model have been improved, further improvements are needed in the areas of electronic exchange of eligibility, claims submissions, claims status inquiries, and payment remittance. Further new technology systems providing efficient, systematic, and streamlined processes that provide a foundation for emerging business and technology trends must be further developed.

The industry has focused on processing pre-care eligibility inquiries from health care providers, post-care claims submissions, inquiries, responses, and financial transactions such as claim submission and tracking, payment remittance advices, and patient statements. Real time transaction processing is supported for only certain processes such as eligibility inquiries, for example. A need for additional real time transaction processing in the areas of payment assurance, referrals, patient health care itineraries, and care management between payers and providers is needed. Presently, most transactions between providers, clearinghouses, and payers are conducted via batch processing systems, resulting in responses to providers often measured in days.

In this context, there is a need for new systems providing efficient, real time, streamlined processes in connection with payment assurance and claim pre-validation in the healthcare field.

SUMMARY

In one embodiment, a method of payment assurance and claim pre-validation is described. The method includes receiving a pre-visit claim for health care related services. In certain aspects, the pre-visit claim includes patient information and provider information. In response to the pre-visit claim, the method may include querying a payer for pre-visit claim detail information and receiving the pre-visit claim detail information from the payer. In certain aspects, the pre-visit claim detail information includes indicators of payment or authorization issues. The method may further include receiving a confirmation of an appointment for the health care related services and, in advance of the appointment, communicating updates to the payment or authorization issues. After the appointment, the method may include submitting a claim for the health care related services administered during the appointment.

In certain aspects and embodiments, a method of claim pre-validation includes submitting a claim for health care related services includes pre-validating a claim by querying a payer for authorization of each lineitem of services rendered and, in response to the query of each lineitem, receiving pre-validation claim detail information from the payer. Revisions to the claim may be received based on the pre-validation claim detail information, and submitting a claim may further include submitting a revised claim for health care related services. The pre-validation claim detail information may include an indicator of any lineitem errors or authorization issues associated with the submission of the claim.

In other aspects and embodiments, a method of payment assurance includes receiving a preliminary schedule of services including services to be rendered, service codes for the services, and payer covered costs for the services, based on terms of a health care related insurance agreement. The service codes for the services and payer covered costs for the services may serve as a basis for a mock claim, for example. The method may further include receiving clinical information regarding a patient, the clinical information including medical conditions of the patient, a care history of the patient, and health care related programs available to the patient. The method may further include receiving referral incentive information for a patient associated with the patient information, the referral incentive information indicating cost differences between preferred and non-preferred specialists.

In another embodiment, a method of payment and claim validation is described. The method includes receiving a claim for health care related services. In certain aspects, the claim includes patient information and provider information. In response to the claim, the method may include querying a payer for claim detail information and receiving the claim detail information from the payer. Revisions to the claim may be received based on the claim detail information, and a revised claim may be submitted for health care related services. The claim detail information may include an indicator of any lineitem errors or authorization issues associated with the submission of the claim.

In another embodiment, a system for payment assurance and claim pre-validation is described. The system includes an assurance network and a computer, for example. The computer, in certain aspects, is configured to receive a pre-visit claim for health care related services and, in response to the pre-visit claim, query a payer for pre-visit claim detail information. The computer may also be configured to receive the pre-visit claim detail information including indicators of payment or authorization issues from the payer. After forwarding the pre-visit claim detail information to a provider, the computer is further configured to receive a confirmation of an appointment for the health care related services and communicate updates to the payment or authorization issues in advance of the appointment. After the appointment, the computer is further configured to submit a claim for the health care related services administered during the appointment.

These and other aspects, objects, features, and embodiments will become apparent to a person of ordinary skill in the art upon consideration of the following detailed description of illustrative embodiments exemplifying the best mode as presently perceived.

BRIEF DESCRIPTION OF THE DRAWINGS

For a more complete understanding of the embodiments described herein, reference is made to the following description, in conjunction with the accompanying figures briefly described as follows:

FIG. 13 illustrates an example interface for payment assurance or claim pre-validation;

FIG. 14 illustrates an example interface for claim pre-validation and submission;

FIG. 15 illustrates another example interface for claim pre-validation and submission.

The drawings illustrate only example embodiments and are not to be considered limiting, as other equally effective embodiments are within the scope and spirit of this disclosure.

DETAILED DESCRIPTION

In the following paragraphs, embodiments are described in further detail by way of example with reference to the attached drawings. In the description, well known components, methods, and/or processing techniques are omitted or briefly described so as not to obscure certain aspects of the various embodiments. Among the embodiments, some aspects and features are implemented by a computer program executed by one or more processors, as described and illustrated. As would be apparent to one having ordinary skill in the art, the embodiments described herein may be implemented, at least in part, by computer-readable instructions in various forms, and the various embodiments are not intended to be limiting to a particular set or sequence of instructions executed by a processor.

Generally, the embodiments described herein are related to a logical fabric of interoperable elements, referred to as an assurance network, that facilitates and promotes effective exchange of information among various constituents in the healthcare supply chain. The healthcare system is comprised of a diverse group of constituents, not limited to insurance and health plans, health care providers such as individuals and institutions specializing in the hands-on delivery of care including Accountable Care Organizations (ACOs) and Patient-Centered Medical Homes (PCMHs), provider surrogates such as facility administrators, care coordinators, and registration/front desk personnel, individuals as members of health plans, patients of providers, surrogates/delegates for other individuals, potential members of a health plan, and potential patients of a provider, employer groups, brokers, healthcare information exchanges, and healthcare insurance exchanges. Each of these constituents or entities interacts with each other and has an ongoing need to exchange and share financial, administrative, clinical, and educational information in transactional and health/wellness contexts.

Today, this exchange of information is difficult and fragmented, resulting in wasted resources. In an effort to address those problems, a key characteristic of the assurance network according to embodiments described herein includes supporting communication among all entities of the healthcare supply chain, sometimes in substantially real time.

Figure 1:
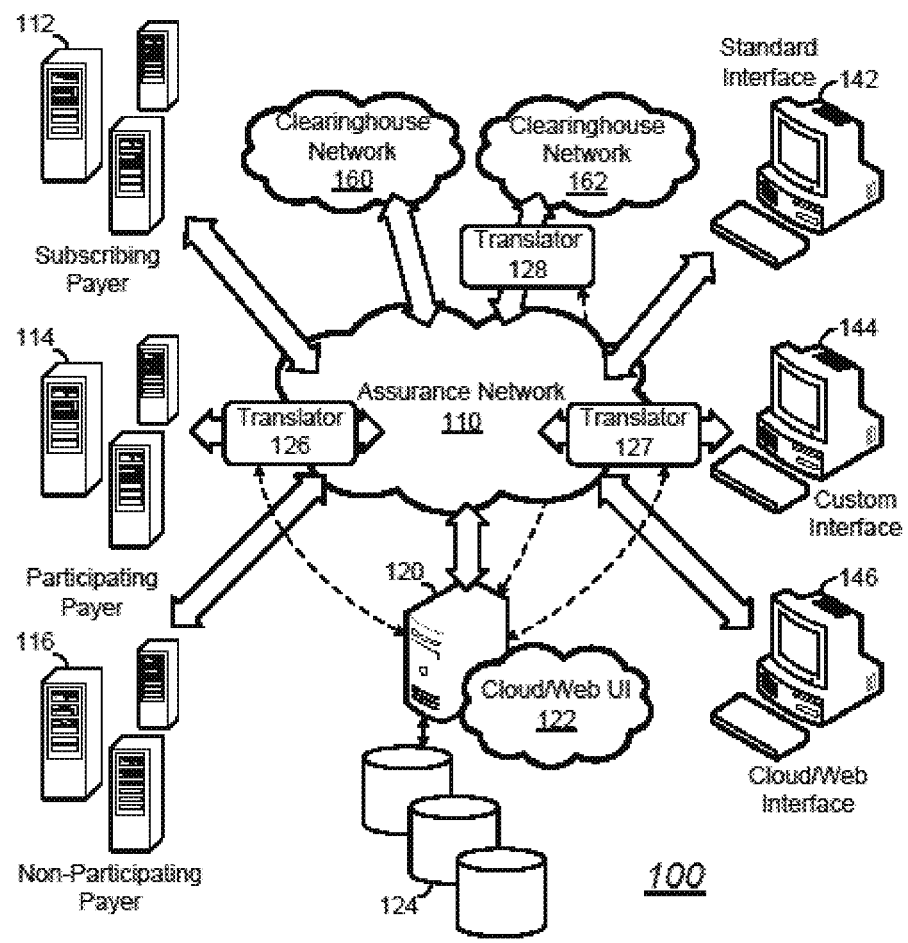
FIG. 1 illustrates an example organizational diagram of a system including certain elements of and parties to an assurance network.

Turning to the drawings, in which like numerals indicate like, but not necessarily the same, elements throughout, exemplary embodiments are described in detail. FIG. 1 illustrates an organizational diagram of a system 100 including certain elements of and parties to an assurance network 110. At the outset, it is noted that not all elements of the system 100 are required in every embodiment. In other words, one or more of the network elements may be omitted or replaced without departing from the spirit and scope of the embodiments.

Increased operational acuity, efficiencies, and revenue may be achieved, for example, according to a strategy of connecting payers and providers via the assurance network 110, by offering payment assurance, claim pre-validation, transparency of payment, claims management, referrals, patient health care itineraries, and care management. According to the embodiments described herein, the assurance network 110 processes a high volume of transactions in substantially real time and provides payment assurance and claim pre-validation answers, for example, among other information. The assurance network 110 may also provide referrals, patient health care itineraries, and care management between payers and providers, for example, as described in further detail below.

The assurance network 110 is a physical computing and communication network across which financial, administrative, clinical, and awareness information flows, with revenue generated by a combination of endpoint connection fees, subscription fees, and traffic fees, for example, in various embodiments. In this context, the assurance network 110 provides a connection point for payers and providers, with the deepest, most assimilated, or integrated connection achieved by "core" assurance network system elements. Here, "core" elements comprise elements designed for deep levels of integration (i.e., seamless operation) in the assurance network 110. In other words, for example, core elements are designed to communicate with the assurance network 110 according to the syntax, protocols, application and software interfaces, and requirements of the assurance network 110, without translation.

It is noted that, in certain aspects, core network elements may be capable of achieving functions that are unavailable to non-core network elements, primarily due to the level of integration achieved by core network elements. In certain aspects, non-core network elements achieve the same (or nearly the same) functions as their core network element counterparts, although via alternative or supplemental means and methods.

As illustrated in FIG. 1, the system 100 includes a subscribing payer 112, a participating payer 114, a non-participating payer 116, a standard provider interface 142, a custom provider interface 144, and a cloud/web provider interface 146. The assurance network 110 is configured to exchange real time financial, administrative, and clinical information between the payers 112, 114, and 116, and the providers 142, 144, and 146. In the context of the healthcare supply chain, the payers 112, 114, and 116 include computing systems or devices of health care related insurance coverage providers such as health maintenance organization (HMO) and preferred provider organization (PPO) insurance plans, for example, without limitation. The payers 112, 114, and 116 may be related to any health care related fields such as medical, dental, and vision fields among others. The providers 142, 144, and 146 may include computing systems or devices of health care related providers such as physicians, clinics, hospitals, pharmacies, provider surrogates, and care coordinators, for example, without limitation.

The system 100 further includes an assurance server 120. The assurance server 120 is an integral element in the system 100 and is configured to coordinate the exchange of real time financial, administrative, and clinical information between the payers 112, 114, and 116, and the providers 142, 144, and 146. As discussed in further detail below, the assurance server 120 includes a database 124 that stores, among other data, software for execution on the assurance server 120. The database 124 also stores data provided from the payers 112, 114, and 116, which may be provided in the form of periodic updates regarding terms and rules of services and coverage provided by the payers 112, 114, and 116. In certain embodiments, the assurance server 120 includes a cloud or web interface 122 to provide access to the assurance network 110 by clients using web browsers, for example, among similar applications.

The assurance server 120 comprises several modules or layers in various embodiments. In certain embodiments, the server 120 includes a security module configured to determine whether a third party is allowed to connect to services. The security module is also configured to determine the paths that a connecting third party is allowed to take. For example, the security module may only allow the clearinghouse networks 160 and 162 to take a path to certain payers or providers. The server 120 may also include a translator layer (similar to or overlapping with the translators 126, 127, or 128) configured to accept communications and data exchanges from select third parties and translate the data exchanges into a standard form. Similarly, the security module also operates on outbound communications and data exchanges.

The assurance server 120 may further include a services module configured to maintain and process logic for real time functions, such as payment assurance, claims submission, eligibility, and claims status inquiries, for example. In certain embodiments, the assurance server 120 may include a rules module that contains business rules of payers. These rules are generally of the form of a data validation check, ensuring the proper data is being sent to the payer system. The assurance server 120 may also include a monitoring and management module configured to monitor the health of the assurance network 110, as well as log and report data across the services provided by the assurance network 110. For example, the monitoring and management module may be configured to track transactions from network input to network output and report performance statistics and issues along the way.

With regard to the subscribing payer 112, the participating payer 114, and the non-participating payer 116, it is noted that the subscribing payer 112 is a core network element offering a high level of integration in the assurance network 110. Such a high level of integration may be attributable, for example, to specialized software, application interfaces, and software and network protocols operating and executing on the computing systems of the subscribing payer 112. In other words, for example, the subscribing payer 112 is configured to comply with the application interfaces and network protocols of the assurance network 110 and the assurance server 120 in the system 100. The subscribing payer 112 may include one or more computing systems directed by the execution of software to perform functions according to the embodiments described herein.

As compared to the subscribing payer 112, the participating payer 114 may be considered a non-core network element. That is, as compared to the subscribing payer 112, the participating payer 114 may offer a lower level of integration in the assurance network 110. This lower level of integration may be attributable, for example, to software executing on the computing systems of the participating payer 114 that, while performing similar overall processes (and for a similar purpose) as the subscribing payer 112, does not strictly comply with the application interfaces and network protocols and requirements of the assurance network 110. As described in further detail below, by reliance on the translator 126 and through terms of agreements, for example, the participating payer 114 can attain substantially the same functional levels of payment assurance, claim pre-validation, referrals, patient health care itineraries, and care management available to the subscribing payer 112. The participating payer 114 may include one or more computing systems directed by the execution of software to perform functions according to the embodiments described herein.

The non-participating payer 116 may also be considered a non-core network element. Thus, the non-participating payer 116 may offer a lower level of integration in the assurance network 110. This lower level of integration may be attributable to the software executing on the computing systems of the non-participating payer 116 that does not comply with the application interfaces and network protocols and requirements of the assurance network 110. However, through terms of agreements, for example, the non-participating payer 116 can attain some level of payment assurance, claim pre-validation, referrals, patient health care itineraries, and care management available to the subscribing and participating payers 112 and 114. For example, the non-participating payer 116 can provide periodic updates of financial and administrative data to the assurance server 120 for the purpose of providing an accurate estimate of patient liability, both prior to and at the point of service. In addition, based on known adjudication practices of the non-participating payer 116, the assurance server 120 can seek to accurately prepare and submit claims for reimbursement.

The translators 126, 127, and 128 are configured to translate the syntax, protocols, and interfaces of non-core network elements to comply with the standards of the assurance network 110. In various embodiments, the translators 126 and 127 comprise hardware and/or software modules and may be integrated at a payer (e.g., the payer 114), at the assurance server 120, or a combination of both. In general, the translators 126, 127, and 128 may be relied upon to facilitate the migration of non-core payers and participants into the assurance network 110. In certain embodiments, as discussed herein, the translators 126, 127, and 128 can be used to substantially achieve integration of non-core network elements into the assurance network 110, so that they appear to be core network elements.

In certain embodiments, the translators 126, 127, and 128 are configured to accept standard assurance network 110 request messages from providers and format them into requests that directly access payer systems using existing integration layers. The translators 126, 127, and 128 are further configured to format the resulting data payload into a standard assurance network 110 message for communication back to the provider. This approach allows rapid integration into foreign systems. In this manner, translators can be deployed to any participating payer to provide reliable, consistent, communications with the assurance network 110. The translators 126, 127, and 128, utilize existing integration layers or directly access exposed web services to the extent possible, rather than rely on an intervening products that introduce an added layer of complexity.

With regard to the standard provider interface 142, the custom provider interface 144, and the cloud/web provider interface 146, these interfaces may be provided by practice management system (PMS) computing devices, for example. Here, the standard provider interface 142 is a core network element, offering a high level of integration in the assurance network 110. The high level of integration may be attributable, for example, to specialized software, application interfaces, and software and network protocols operating and executing on the computing systems of the standard provider interface 142. In other words, the standard provider interface 142 is configured to comply with the application interfaces and network protocols of the assurance network 110 and the assurance server 120 in the system 100. The standard provider interface 142 may include one or more computing systems directed by the execution of software to perform functions according to the embodiments described herein.

As compared to the standard provider interface 142, the custom provider interface 144 may be considered a non-core network element. That is, as compared to the standard provider interface 142, the custom provider interface 144 may offer a lower level of integration in the assurance network 110. This lower level of integration may be attributable, for example, to software executing on the computing systems of the custom provider interface 144 that, while performing similar overall processes (and for a similar purpose) as the standard provider interface 142, does not strictly comply with the application interfaces and network protocols and requirements of the assurance network 110. However, by reliance on the translator 127 and through terms of agreements, for example, the custom provider interface 144 can attain substantially the same functional levels of payment assurance, claim pre-validation, referrals, patient health care itineraries, and care management available to the standard provider interface 142. The custom provider interface 144 may include one or more computing systems directed by the execution of software to perform functions according to the embodiments described herein.

The cloud/web provider interface 146 is a provider interface that is available via a web browser of a client computing system of the provider. The cloud or web interface 122 of the assurance server 120 may be accessed by the cloud/web provider interface 146 to provide access to the assurance network 110 by clients using web browsers, for example. Generally, in various aspects and embodiments, the same functions and features of the assurance network 110 that are available to the standard provider interface 142 and the custom provider interface 144 are available via the cloud/web provider interface 146. Providers that rely on the cloud/web provider interface 146 may be without an integrated PMS or may use a PMS that is not capable of interfacing directly with the assurance network 110. These providers will utilize the cloud or web interface 122 to enter and receive financial, administrative, and clinical information. Alternatively, these providers may send a consolidated file of multiple requests to the assurance network 110.

It is noted that the system 100 is configured to permit any of the payers 112, 114, and 116 to communicate with any of the providers 142, 144, and 146 for real time payment assurance, claim pre-validation, transparency of payment, claims management, referrals, patient health care itineraries, and care management. Depending upon the level of integration among them, such as for providers and payers using core network elements, substantially real time communications is available among them. Further, for providers and payers that interface with the translators 126 and 127, the system 100 is configured to provide substantially real time communications. In certain aspects, the assurance network 110 can be considered a health care related services payment or transaction clearinghouse network.

In certain aspects, communications via the assurance network 110 (and the assurance server 120) between the standard provider interface 142 and the subscribing payer 112, for which a deep level of integration between those core network elements is available, may result in the greatest amount of relevant information being communicated and exposed between them. Similarly, in certain aspects, communications via the assurance network 110 between the custom provider interface 144 and the participating payer 114, for which a lower level of integration between those core network elements is available, may result in less information being communicated and exposed between them. However, using the translators 126 and 127 in the assurance network 110, levels of integration, communication, and relevant information exposure may be achieved between the custom provider interface 144 and the participating payer 114 that is similar to the levels of integration achieved between the standard provider interface 142 and the subscribing payer 112.

The clearinghouse networks 160 and 162 are communicatively coupled to other payers and providers. As needed, the clearinghouse networks 160 and 162 may route communications for payment assurance, claim pre-validation, and payment of claims, for example, over the assurance network 110. In certain embodiments, a fee may be associated with routing and/or processing certain communications accepted from the clearinghouse networks 160 and 162. Similarly, fees may be associated with routing communications from the assurance network 110 over the clearinghouse networks 160 and 162. As illustrated in FIG. 1, the translator 128 is provided between the assurance network 110 and the clearinghouse network 162. In various embodiments, the translator 128 comprises hardware and/or software modules and may be integrated as part of one of the clearinghouse networks 160 and 162, at the assurance server 120, or a combination of both. In general, the translator 128 may be relied upon to facilitate the assimilation of protocols between the clearinghouse networks 160 and 162 and the assurance network 110. With the communicative coupling of the clearinghouse networks 160 and 162 and the assurance network 110, the system 100 is configured to permit the payers 112, 114, and 116 and the providers 142, 144, and 146 to communicate with payers and providers that would not otherwise be accessible, for example, for real time payment assurance, claim pre-validation, transparency of payment, claims management, referrals, patient health care itineraries, and care management.

With regard to the various levels of integration between the parties to and network elements of the assurance network 110, various types and levels of exchanges may be provided. For example, for exchanges between providers and payers that utilize core network elements and allow a high level integration into their systems, the assurance network 110 supports real time (or substantial real time) adjudication. For exchanges between providers and supported payers that do not actively participate in the real time exchange but provide periodic updates to a range of available data stores (including but not limited to eligibility, claims status, "limits"

calculations, and deductible status), the assurance server 120 stores this information in the database 124 to provide responses to provider inquiries and to estimate claims. For exchanges between providers and unsupported payers that do not actively participate in the exchange of information beyond providing basic eligibility, a third party claims pricing engine or similar technology may be employed to estimate claims adjudication results and patient liability amounts.

As described in further detail below, as the system 100 is configured to facilitate communications, transactions, and exchanges between payers and providers for real time payment assurance and claim pre-validation, for example, the differences between real time adjudication, synthetic adjudication, and mock adjudication for payment assurance and claim pre-validation should be appreciated. The assurance network 110 permits mock adjudication by executing claim adjudication on a "mock" basis to deliver an adjudication quality result without actually processing the claim (i.e., the claim is "pre-validated"). Synthetic adjudication is a process for exchanges with non-core or non-participating payers (e.g., payers that do not allow real time connectivity between their computing systems and the assurance network 110). In synthetic adjudication, payers can expose the assurance server 120 with a range of eligibility and claims adjudication information for storage in the database 124, to support provider activities before and through care delivery. The most effective synthetic adjudication arrangements would require payers to provide daily eligibility downloads. This information may include current costs for deductibles, out of pocket limits, etc.,—which in combination with any exposed claims adjudication rules and assurance network "learned" rules, would provide the most accurate synthetic adjudication of a claim possible. The assurance network "learned" rules may be dynamically garnered from previous claims submissions and results learned through heuristics and analysis of actual payer-specific behaviors (e.g., payer A always rejects "strep culture" under a "wellness visit", but not when a presenting medical diagnosis is indicative of a potential presence of infection).

Figure 2:
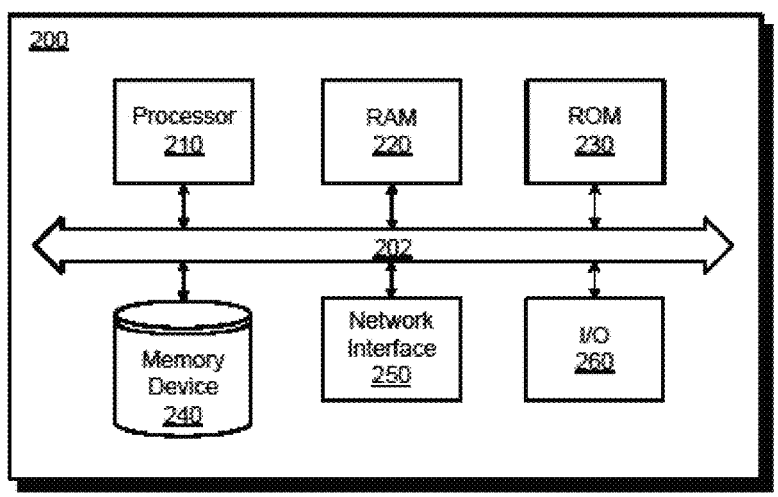
FIG. 2 illustrates an example general purpose computer according to certain aspects and embodiments described herein.

Turning to FIG. 2, an example hardware diagram of a general purpose computer 200 is illustrated. Any of the computing devices described in connection with FIG. 1 may be implements using one or more elements of the general purpose computer 200, as would be readily understood by one having skill in the art. The computer 200 includes a processor 210, a Random Access Memory (RAM) 220, a Read Only Memory (ROM) 230, a memory device 240, a network interface 250, and an Input Output (I/O) interface 260. The elements of the computer 200 are communicatively coupled via a bus 202.

In various embodiments, the processor 210 comprises any well known general purpose arithmetic processor or Application Specific Integrated Circuit ("ASIC"). The RAM and ROM 220 and 230 comprise any well known random access or read only memory device that stores computer-readable instructions to be executed by the processor 210. The memory device 240 stores computer-readable instructions thereon that, when executed by the processor 210, direct the processor 210 to execute various aspects of the present invention described herein. When the processor 210 comprises an ASIC, the processes described herein may be executed by the ASIC according to an embedded circuitry design of the ASIC, by firmware of the ASIC, or both an embedded circuitry design and firmware of the ASIC. As a non-limiting example group, the memory device 240 comprises one or more of an optical disc, a magnetic disc, a semiconductor memory (i.e., a flash based memory), a magnetic tape memory, a removable memory, combinations thereof, or any other known memory means for storing computer-readable instructions. The network interface 250 comprises hardware interfaces to communicate over data networks. The I/O interface 260 comprises device input and output interfaces such as keyboard, pointing device, display, communication, and other interfaces. The bus 202 electrically and communicatively couples the processor 210, the RAM 220, the ROM 230, the memory device 240, the network interface 250, and the I/O interface 260, so that data and instructions may be communicated among them.

In operation, the processor 210 is configured to retrieve computer-readable instructions stored on the memory device 240, the RAM 220, the ROM 230, or another storage means, and copy the computer-readable instructions to the RAM 220 or the ROM 230 for execution, for example. The processor 210 is further configured to execute the computer-readable instructions to implement various aspects and features of the present invention. For example, the processor 210 may be adapted and configured to execute the processes described below with reference to FIGS. 3-5, including the processes described as being performed by the assurance network 110 and the assurance server 120.

Figure 3:
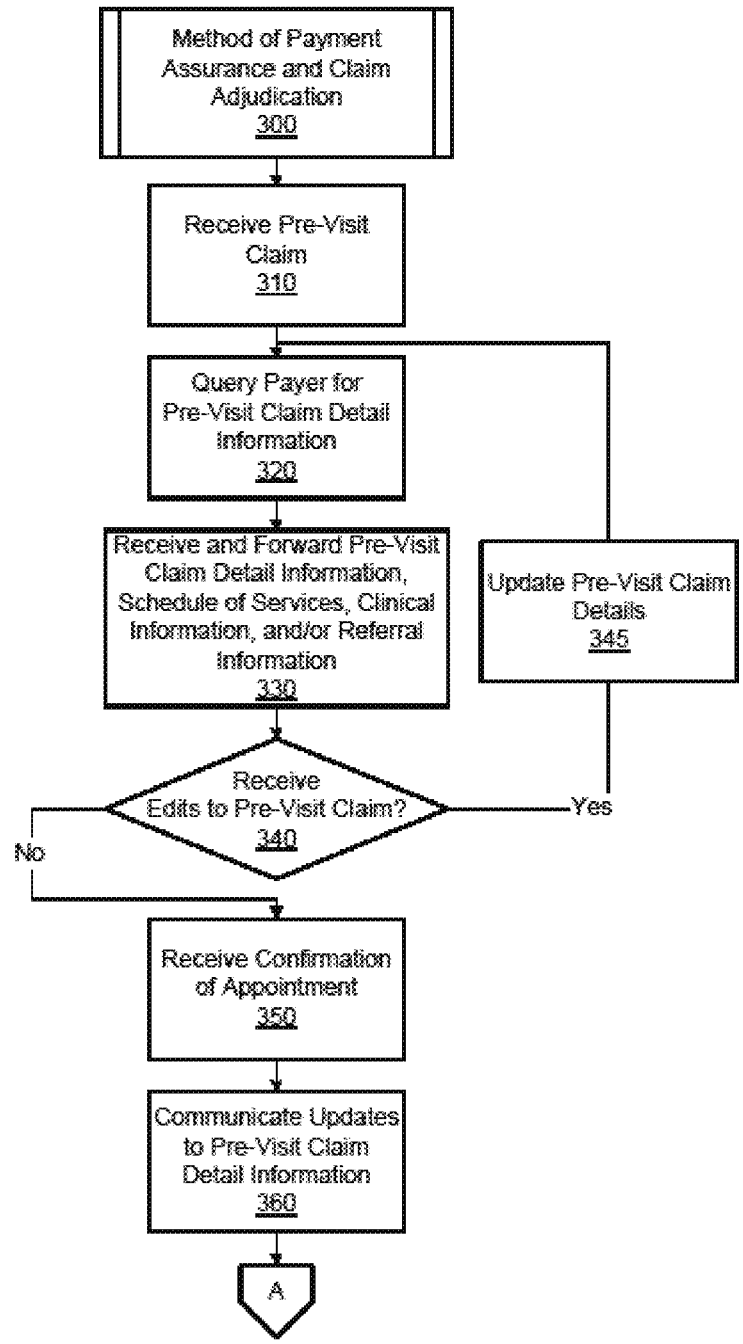
FIG. 3 illustrates an example process of payment assurance and claim adjudication according to certain aspects and embodiments described herein.
Figure 4:
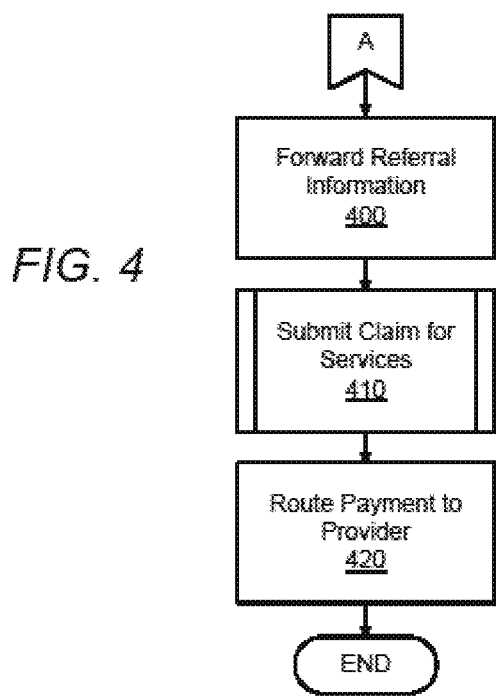
FIG. 4 further illustrates the example process of payment assurance and claim adjudication.
Figure 5:
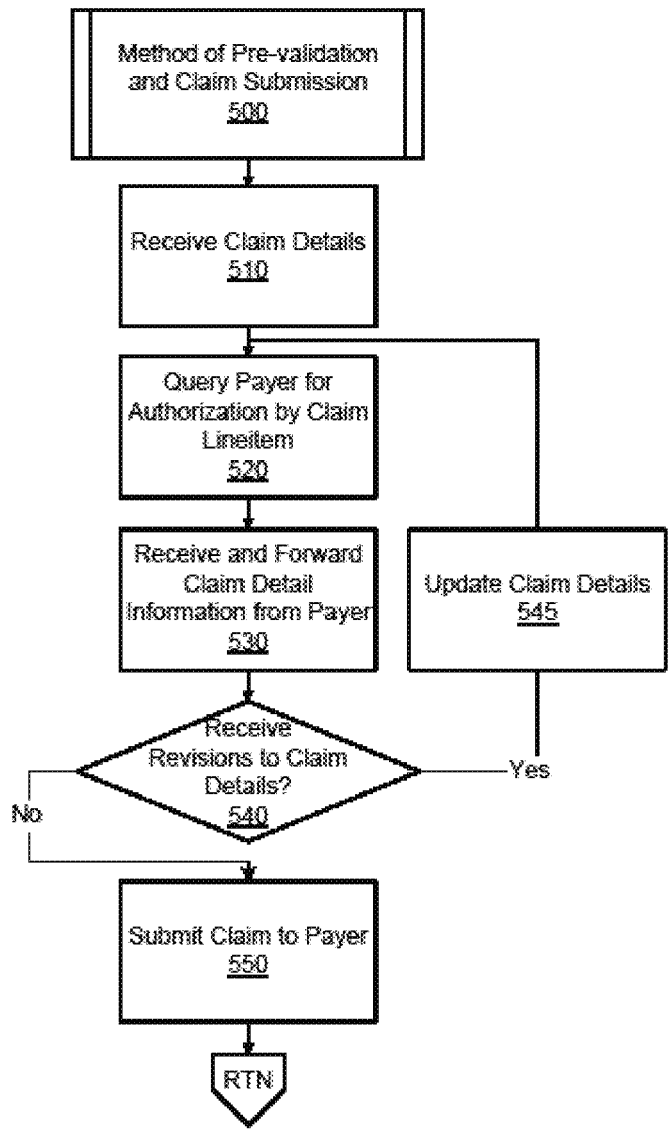
FIG. 5 illustrates an example process of pre-validation and claim submission according to certain aspects and embodiments described herein.

Before turning to the process flow diagrams of FIGS. 3-5, it is noted that embodiments described herein may be practiced using an alternative order of the steps illustrated in FIGS. 3-5. That is, the process flows illustrated in FIGS. 3-5 are provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope and spirit of the embodiments.

Turning to FIG. 3, an example process or method 300 of payment assurance and claim adjudication according to certain aspects and embodiments described herein is illustrated. While the process illustrated in FIG. 3 is described in connection with the system 100 of FIG. 1, the process is not limited to being performed by the system 100. At step 310, the assurance network 110 and the assurance server 120 receive a pre-visit claim for healthcare related service. In one example, the pre-visit claim includes patient information and provider information. Here, it is noted that, when a patient contacts a provider (e.g., physician's office) to schedule an appointment, front desk personnel of the provider may use an interface to the system 100, such as one of the interfaces 142, 144, or 146, to create a pre-visit claim for healthcare related services. In certain aspects, this pre-visit claim is processed as a mock adjudication of the claim.

Figure 6:
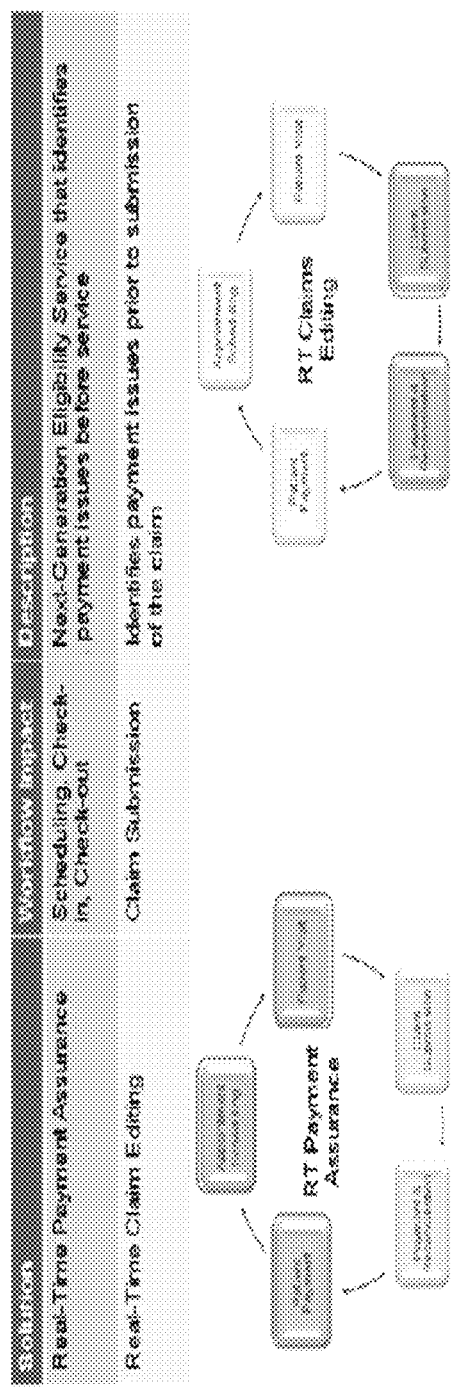
FIG. 6 illustrates an example flow diagram of real time payment assurance and claim editing.

With reference to FIG. 6, step 310 of FIG. 3 falls under the real time payment assurance workflow, performed at appointment scheduling. The purpose of real time payment assurance is to identify payment issues before health care services are rendered, for both the patient and the provider. Specifically, the patient can be accurately advised of costs for the services before they are rendered (and even before the appointment is scheduled). The provider, similarly, will be advised of the patient's costs. The provider will also be advised of a patient's coverage under the patient's health care insurance plan for the services. Further, the patient can be advised of any conditions to benefits under the patient's health care insurance plan. For example, the patient may be advised that the services identified by the pre-visit claim are not covered benefits, are not covered benefits at the requesting provider's office (e.g., the provider is out of network), or that the services are not covered due to lack of evidence of prior coverage for a pre-existing condition. Alternatively, real time payment assurance can indicate that one or all of the services identified by the pre-visit claim are covered, by service lineitem or procedure code, for example. As discussed above, the system 100 is configured to provide real time feedback for the payment assurance using a real time communications link between providers and payers via the assurance network 110 and the assurance server 120. As suggested in FIG. 6, a request for real time payment assurance may be performed by a provider, for example, before scheduling an appointment for a patient, when the patient checks in for the appointment, or when the patient checks out from the appointment.

Figure 7:
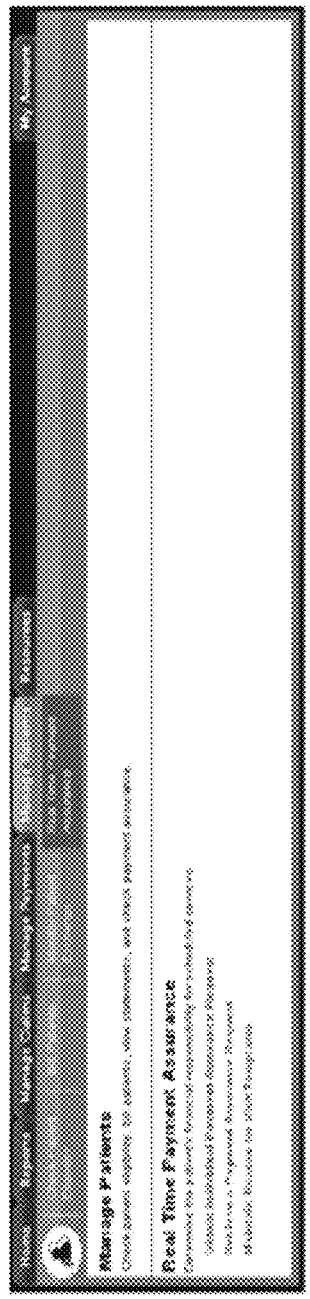
FIG. 7 illustrates an example interface for real time payment assurance.
Figure 8:
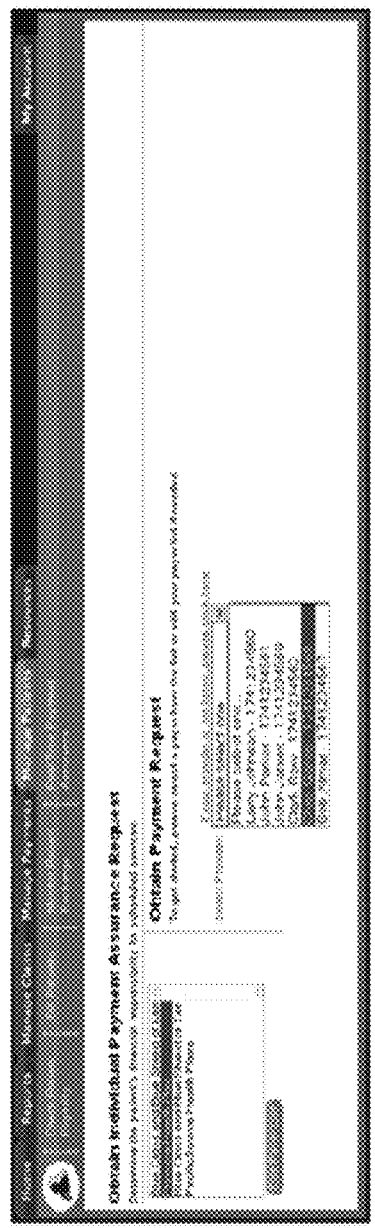
FIG. 8 further illustrates an example interface for real time payment assurance.
Figure 9:
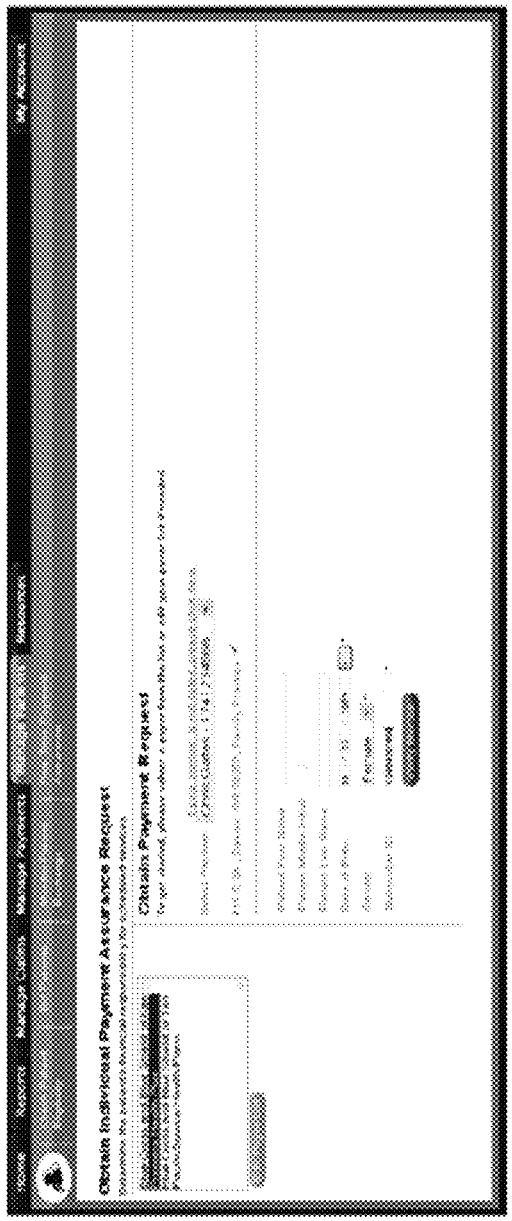
FIG. 9 further illustrates an example interface for real time payment assurance.

Turning to FIG. 7, an example illustration of an interface for real time payment assurance is provided. The example interface illustrated in FIG. 7 may be provided by the cloud or web interface 122 of the assurance server 120 to provide access by client interfaces using web browsers such as the interface 146. After navigating to the interface using a uniform resource locator (URL), for example, the provider is presented with an easy to follow user interface to enter information related to the patient and the services to be rendered to the patient, for real time payment assurance. Turning to FIG. 8, as illustrated, a provider may identify a patient's health care insurance plan and a particular physician to render services. Turning to FIG. 9, additional information is provided by the provider to obtain assurance for payment. As illustrated in FIG. 9, after entering health care insurance plan and physician information, patient information such as a patient's name, date of birth, gender, and healthcare subscriber ID, for example, may be provided at the interface. It is noted that the interfaces illustrated in FIGS. 7-9 are provided by way of example only. In other embodiments, additional or alternative entry fields for both patient and provider information may be incorporated into the interface.

Referring back to FIG. 3, at step 320, in response to the pre-visit claim, the assurance server 120 queries one or more payers for pre-visit claim detail information. Here, the assurance server 120 queries one of the payers 112, 114, or 116, via the assurance network 110, for example, based on the patient's health care plan insurance information. Here, in response to the query from the assurance server 120, the payer accesses the relevant coverage data related to the patient and sends the relevant coverage data back to the assurance server 120. It is noted that the query may include patient information, provider information, and a listing of services to be rendered by lineitem, for example, among other information. Using this information, the payer is configured to determine patient coverage for the services, patient costs (e.g., copays) for the services, and coverage allowances to be paid to the provider for the services. The payer is also configured to determine services that are not covered for any reason. The relevant coverage (and lack of coverage) information is transmitted back to the assurance server 120 via the assurance network 110.

At step 330, the assurance server 120 receives the pre-visit claim detail information from the payer. In various embodiments, the pre-visit claim detail information. This pre-visit claim detail information may include patient co-pay information and other indicators of payment or authorization issues as discussed herein. For example, payment authorization issues may be related to gaps in coverage, ineligible procedures, ineligible providers, ineligible combinations of procedures and providers, or other alerts which require attention. In certain embodiments, the assurance server 120 may also receive a preliminary or modified schedule of services to be rendered, service codes for these services, and payer covered costs for these services, if the pre-visit claim identifies a general service to be rendered such as a wellness checkup. The information received from the payer is forwarded back to the interface of the provider for review. At this time, the provider may advise the patient of the patient's costs for the services along with any alerts or issues identified by the payer. Again, with this information provided to the provider in substantially real time, the provider may both advise the patient of patient costs and be apprised of any limitations on the patient's coverage. As such, real time transparency of coverage and costs is offered to both the patient and provider according to the method 300. The provider may make edits to the pre-visit claim iteratively, as discussed below, to address any alerts and issues. Because both the patient and the provider are provided with relevant coverage information in advance of any services being rendered, the coverage expectations of the patient and the provider can be clarified before the services are rendered. According to the method 300 described herein, the following example advantages (among others) are available and/or achieved: (1) early notice of payment issues; (2) adjudication quality information presented substantially real time to patients and providers; (3) feedback is integrated into current client interfaces of providers; (4) minimal changes to office workflow at the provider are required; (5) denials, appeals, and duplicate claims can be eliminated or greatly reduced; (6) patient collections at the point of service are increased and open receivables are decreased; and (7) a foundation for clinical collaboration is provided.

For additional context in connection with steps 310, 320, and 330, the example in this paragraph may be considered. Elizabeth, a front desk worker at a physician's office, schedules an annual exam visit for patient Susan Smith with Dr. Jones. As Elizabeth enters Susan's information and schedules a date for the appointment, a response from the assurance network 110 and the assurance server 120 indicates the following: (1) the service will be fully covered by Susan's health care insurance plan and Susan won't need to make a co-payment at the time of service; (2) Susan has been identified as a diabetic and has missed the following recommended services (XX, YY, ZZ); (3) Susan has not complied with her recommended insulin refill schedule; (4) Susan has been to the emergency room 3 times over the past 12 months; and (5) Susan is eligible to become part of a new Diabetic Management Program with her health plan and, if Dr. Jones completes the gapped services and convinces Susan to sign up for the program, he'll get a $100 bonus and Susan will receive incentive credits in the form of "healthcare dollars".

At step 340, the provider has the option to edit the pre-visit claim based on the pre-visit detail information received from the assurance network 110 and the assurance server 120. For example, the patient may decline certain services based on the coverage and cost information, and the provider may identify additional services to be performed based on a schedule of recommended services provided by the payer. If edits to the pre-visit claim are entered by the provider at step 340, the process proceeds to step 345 where the pre-visit claim details are updated. The updated pre-visit claim details are returned to the assurance server 120 for additional processing at step 320. That is, as illustrated in FIG. 3, once the pre-visit claim details have been updated at step 345, the process returns again to step 320 where the assurance server 120 queries the payer for updated pre-visit claim detail information. Thus, the process of payment assurance and scheduling an appointment is iterative according to certain aspects of the method 300. This payment assurance for a pre-visit claim or mock adjudication of a pre-visit claim is facilitated by the assurance network 110 and the assurance server 120 of the system 100, for example, as described above. Again, as illustrated in FIG. 6, it is noted that the iterative process for payment assurance may be applicable at scheduling, check-in, check-out, or at any other suitable point in the workflow.

Figure 10:
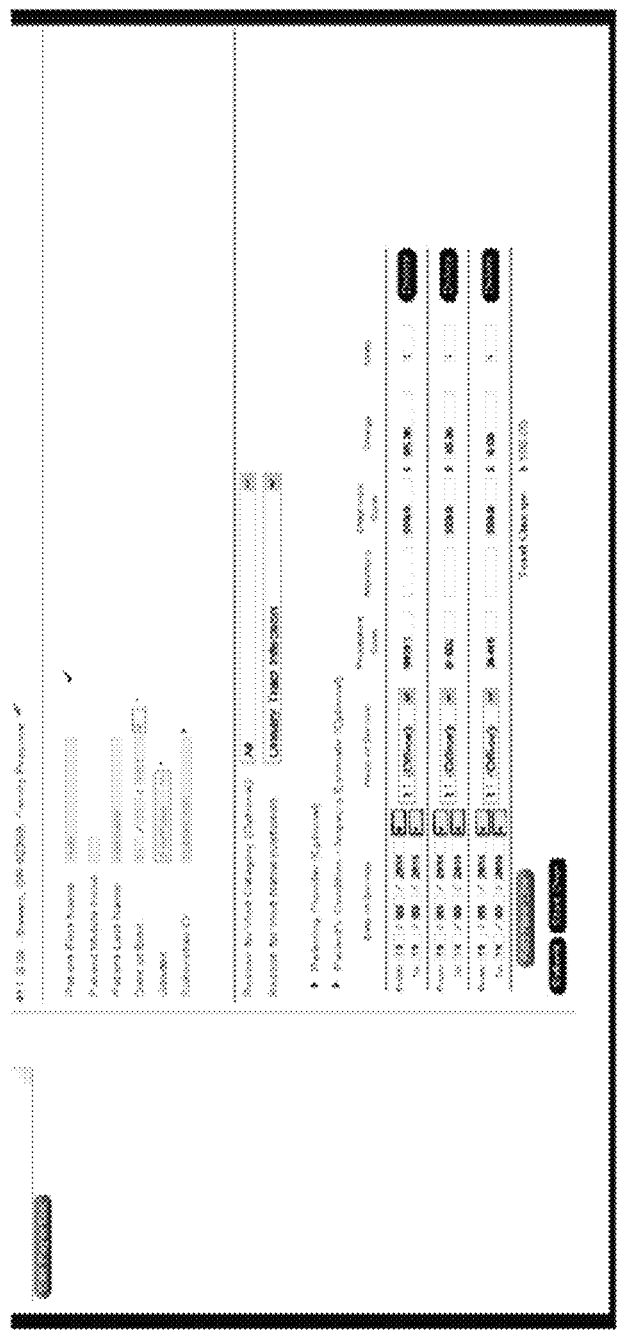
FIG. 10 illustrates an example interface for editing a pre-visit claim.
Figure 11:
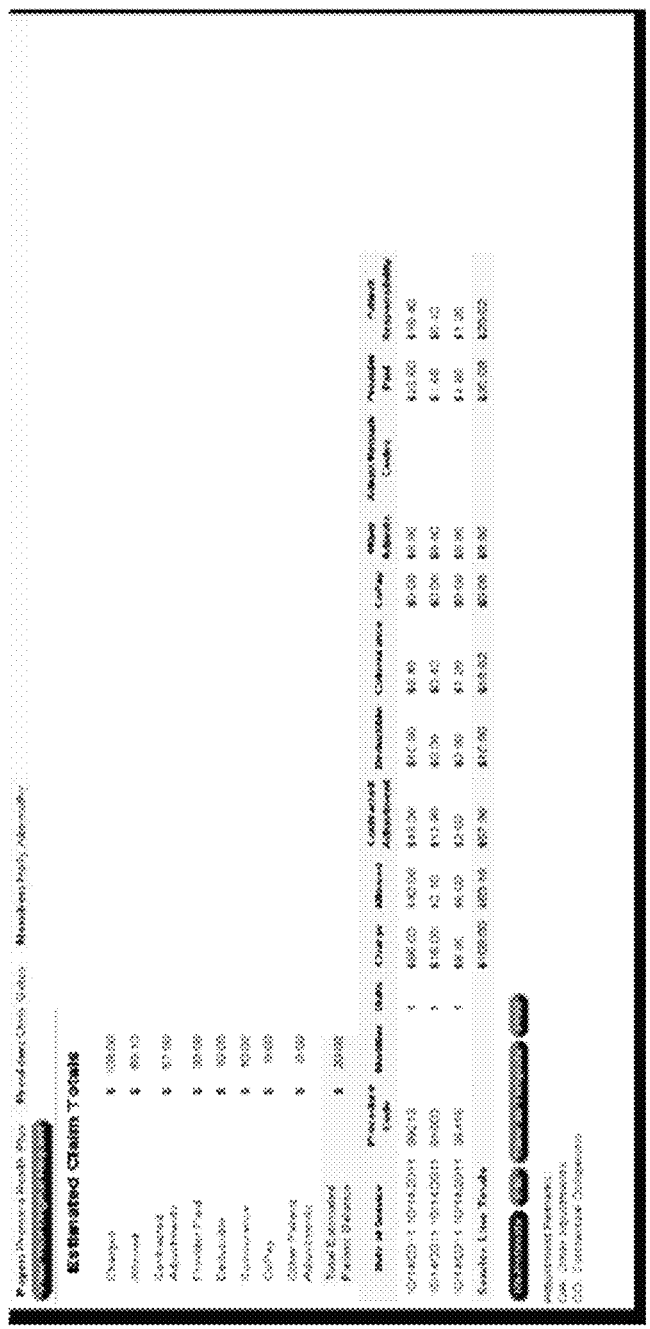
FIG. 11 illustrates an example estimate of costs for a pre-visit claim.

Turning to FIG. 10, an example interface for editing a pre-visit claim is illustrated. In FIG. 10, health care related service information is provided at the interface, such as service date, service location, procedure codes, modifier codes, diagnostic codes, charges, and quantities, for editing. In FIG. 10, an example schedule of services is provided for a urinary tract infection. In various embodiments, the schedule of services may be set by the provider or provided by the payer in response to the provider's selection of "urinary tract infection" as a reason for the visit. In other words, the payer may provide substantially real time information regarding recommended schedules of services to be provided, depending upon the selected reason for the visit. As illustrated in FIG. 10, a request for payment assurance can take the form of a pre-visit claim and include a suggested schedule of services to be provided. In FIG. 10, a provider's ability to iteratively update or edit pre-visit claim information is illustrated, because several fields of the schedule of services may be edited by the provider. After the fields are updates, the provider may submit the information to the assurance network 110 and the assurance server 120. Turning to FIG. 11, a completed estimate of costs for the pre-visit claim is illustrated. Here, information such as charges, allowed costs, adjustments, deductibles, co-insurance payments, co-pays, and other information is available. The amount of provider costs and provider-paid costs is also illustrated along with the patient's costs. It is noted that the interfaces illustrated in FIGS. 10 and 11 are provided by way of example only. In other embodiments, additional or alternative entry fields for both patient and provider information may be incorporated into the interface.

Referring again to FIG. 3, the assurance server 120 receives a confirmation of an appointment at step 350 after all updates and edits to the pre-visit claim have been entered and the patient is aware of the schedule of services to be rendered and the costs associated with those services, if any. At step 360, between the time that the appointment is scheduled and the time of the appointment, the assurance server 120 communicates updates to the pre-visit claim detail information to the provider. That is, if changes in a patient's coverage occur between the time that the appointment is scheduled and the time of the appointment, the assurance server 120 communicates updated information to the provider. For example, if a payment alert was identified before scheduling the appointment, changed circumstances may render the alert unnecessary if the patient clears the alert by providing necessary information (e.g., proof of prior coverage) to the payer before the appointment. In this case, the assurance server 120 would communicate updated information to the provider clearing the alert. Alternatively, if changed circumstances such as cancellation of coverage occurs, the assurance server 120 would communicate updated information indicating that the patient's coverage has been cancelled. In response to such updated information, the provider may contact the patient to cancel or reschedule the appointment, if deemed necessary. In certain embodiments, the assurance server 120 periodically queries payers for pending appointments, to determine whether changed circumstances have occurred.

Figure 12:
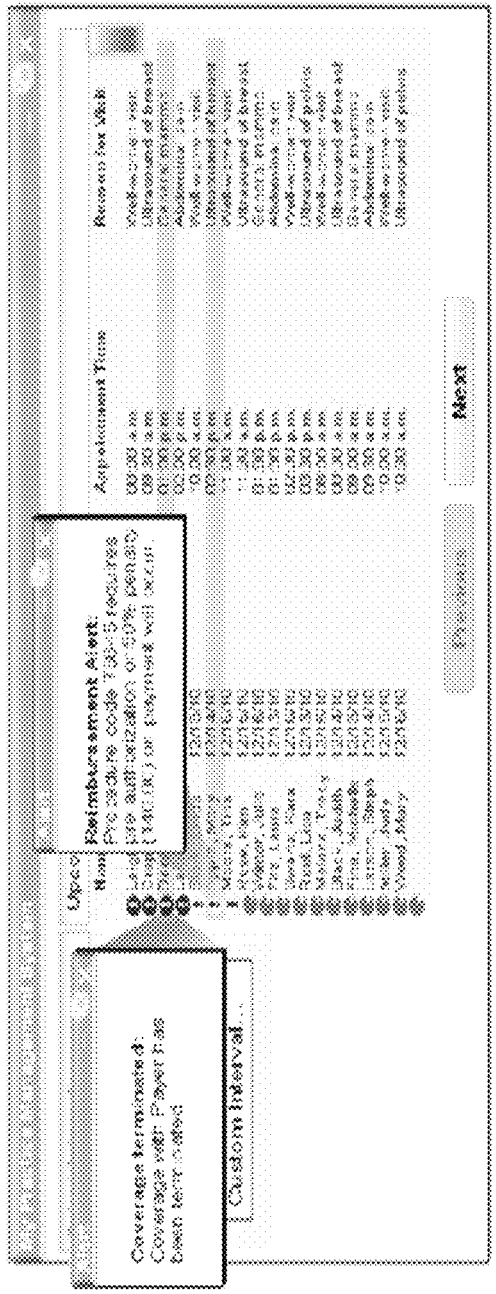
FIG. 12 illustrates an example interface for providing updates to pre-visit claim detail information.

Turning to FIG. 12, an example interface providing updates to pre-visit claim detail information is illustrated. As illustrated in FIG. 12, a list of appointments is provided along with alert information. As one example, an alert that coverage has been cancelled or terminated is provided by the interface. In response to such an alert, the provider may contact the patient to cancel or reschedule the appointment, if deemed necessary, unless further or alternative payment assurances or a suitable explanation is provided by the patient. As another example, an alert that a certain procedure code requires pre-authorization to mitigate a penalty is provided by the interface. This alert may have been presented to the patient and provider before the appointment was scheduled, or it may have been provided only as an update after the appointment was scheduled. Here, the updates assist the provider to identify payment issues before rendering services. In connection with the updates, other information consistent with the embodiments described herein may also be provided. For example, updated information regarding a patient's medical policy, gaps in care, care alerts, patient incentive eligibility, provider incentive eligibility, wellness/coaching recommendations, and other information may be provided. These updates are, in certain exemplary embodiments, integrated with the interfaces available to providers. Real time updates to risk assessment and stratification information for a patient may also be provided. Based on a known diagnosis for "diabetes mellitus," for example, real time reassessments and updates of patient risk may be provided in connection with emerging/potential procedures identified by payers, including the identification of new care management opportunities.

Turning to FIG. 4, patient referral information is forwarded by the assurance network 110 and the assurance server 120 to the provider in certain embodiments at step 400. For context, the following example is provided in connection with patient referral information. Dr. Jones recently joined a health plan's "Gold Star" program. As part of the program, he is provided incentives to keep his patients within the Gold Star network. Dr. Jones' patient, Tim Smith needs to see a specialist. When providing services and recommending a specialist, Dr. Jones explains why he prefers a certain specialist and prints a receipt for Tim that shows the differences in cost to see the Gold Star specialist vs. another specialist. Tim agrees to go to Gold Star specialist. Dr. Jones' office manager, Samantha, submits a real time referral request and sends patient records to Dr. Samoya with Tim's clinical history as well as a payment assurance for a consult visit. It is noted that, as with other steps, step 400 may be omitted in certain embodiments. Alternatively, as with other steps, step 400 may occur at another timing among the remaining steps in the method 300.

After the appointment, at step 410, the provider relies on the assurance network 110 and assurance server 120 to submit a claim for the services administered to the patent during the appointment. In certain cases, the claim is submitted based on the pre-visit claim detail information previously provided from the payer—sometimes saving time and effort. However, it is noted that the provider may rely on the assurance network 110 and assurance server 120 to submit a claim for services even if no pre-visit claim was prepared for the appointment. It is noted that, while the submission of a claim at step 410 includes characteristics similar to submission of a pre-visit claim, the primary difference is that the submission of a claim at step 410 occurs at a different timing in the workflow. With reference again to FIG. 6, submission of a claim at step 410 occurs after services have been rendered and is used to identify payment issues prior to submission of a claim for payment by a payer. At step 420, based on the submission of the claim at step 410, payment is routed to the provided by the payer for the patient. Payment may be routed according to any known payment routing methods accepted in the industry.

Turning to FIG. 5, an example process or method 500 for pre-validation and claim submission is illustrated. At step 510, the assurance network 110 and the assurance server 120 receive claim details for pre-validation of a claim from a provider. At step 520, the assurance server 120 queries a payer for authorization of the services rendered during an appointment to satisfy the claim. In certain embodiments, the authorization is queried by each lineitem of the claim. It is noted that the payer for the claim is identified in the claim details. In response to the query, the assurance server 120 receives pre-validation claim detail information from the payer at step 530. In certain embodiments consistent with the description provided herein, the pre-validation claim detail information may be provided for each lineitem of the claim. The pre-validation claim detail information received from the payer at step 530 is also forwarded back to an interface of the provider for review.

At step 540, the provider has the option to edit the claim details based on the pre-validation claim detail information received from the assurance server 120. For example, the provider may update procedure and/or diagnostic codes for certain services based on payment alerts in the pre-validation claim detail information. If edits to the claim details are entered by the provider at step 540, the process proceeds to step 545 where the claim details are updated. The updated claim details are returned to the assurance server 120 for additional processing at step 520. That is, as illustrated in FIG. 5, once the claim details have been updated at step 545, the process returns again to step 520 where the assurance server 120 queries the payer for updated claim detail information. Thus, the process of pre-validation of a claim is iterative according to certain aspects of the method 500.

Turning to FIGS. 13-16, example interfaces for claim pre-validation and submission are illustrated. In certain aspects, the example interfaces for claim pre-validation in FIGS. 13-16 are similar to those for pre-visit claim assurance in FIGS. 7-11. However, it is noted that the interfaces illustrated in FIGS. 13-16 are examples of "integrated" interfaces, available at one of the standard or custom interfaces 142 or 144, for example. Modifications to and/or combinations of any of the interfaces illustrated in FIGS. 7-11 or FIGS. 13-16 are within the scope and spirit of the embodiments described herein and may be provided by the system 100 for pre-visit claim assurance or claim pre-validation.

Figure 13:
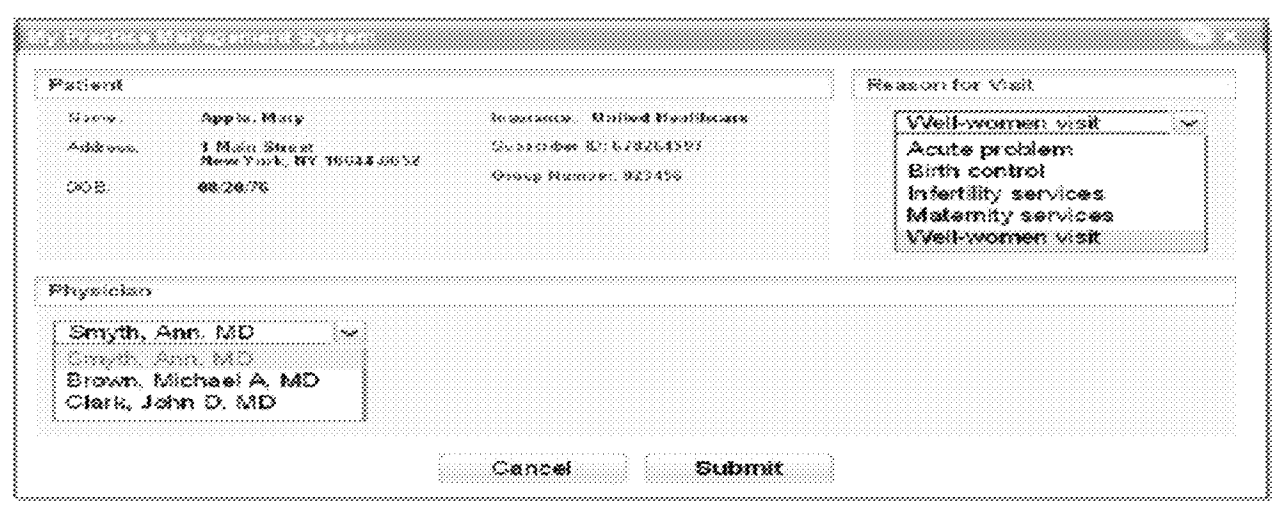
Figure 14:
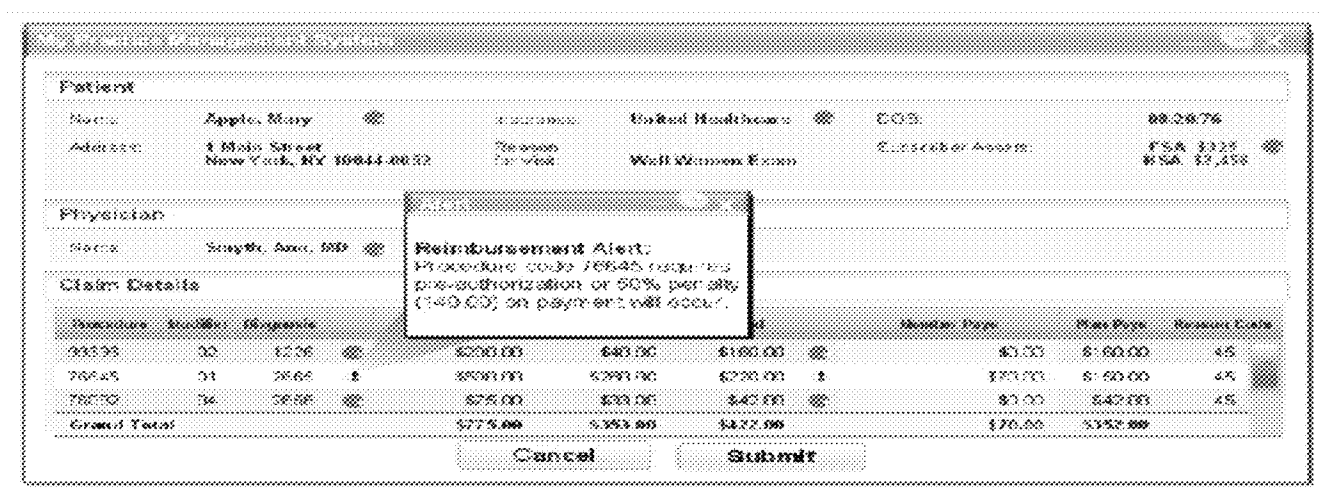
Figure 15:
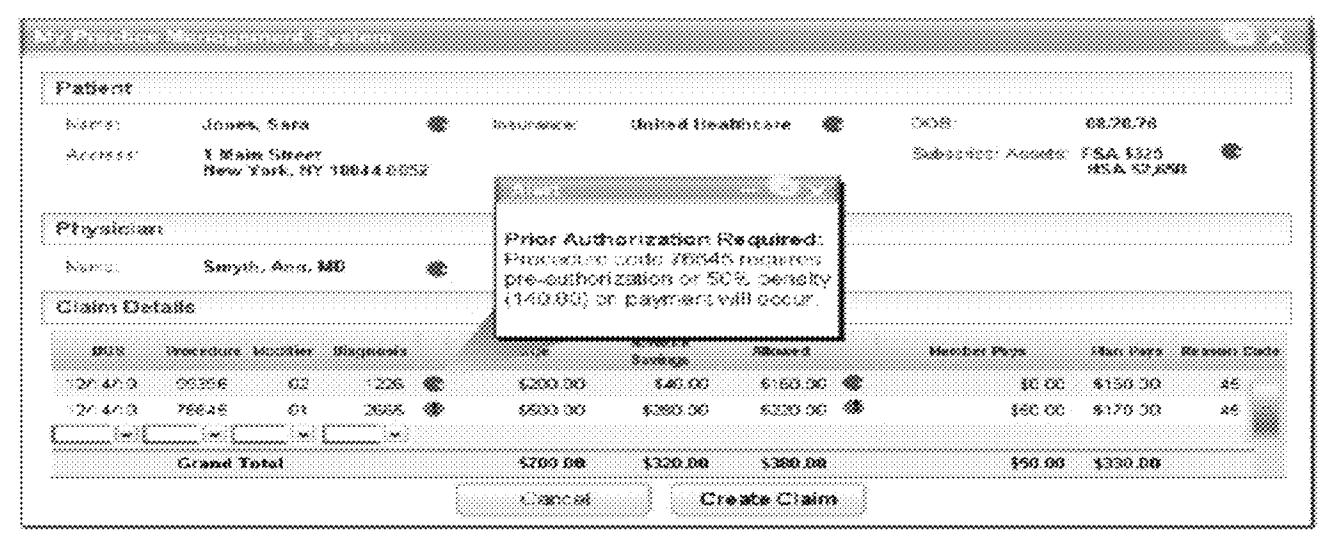
Figure 16:
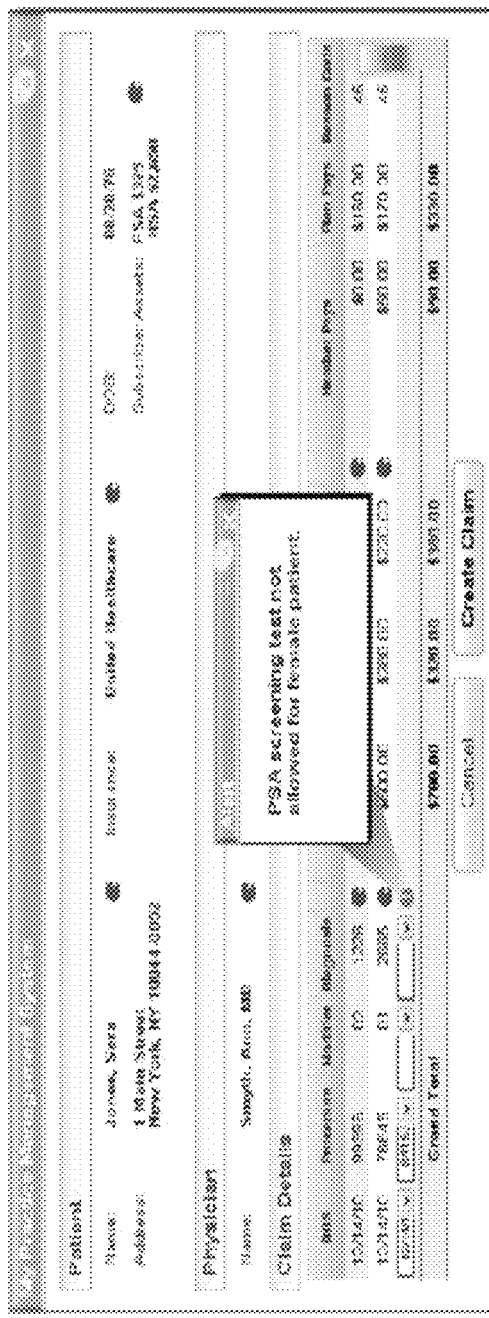
FIG. 16 illustrates another example interface for claim pre-validation and submission.

In FIG. 13, an interface preparing a claim for pre-validation is illustrated. Patient and physician information is entered, for example, along with a reason for the visit in which services were rendered. In FIG. 14, an interface including a display of the pre-validation claim detail information is illustrated. Here, a provider is able to identify payment alerts based on the claim detail information submitted to the assurance network 110 and assurance server 120. Again, it is noted that this information is provided substantially real time to the provider. In FIG. 15, an interface including a display of pre-validation claim detail information and a provider's ability to edit the claim detail information is illustrated. In FIG. 16, an interface including an alternative display of pre-validation claim detail information is illustrated. In connection with FIG. 16, it is noted that a provider is able to update claim detail information based on the pre-validation claim detail information. For example, if the pre-validation claim detail information provides an alert that a certain screening or procedure is not allowed (i.e., will not be covered for payment), the provider is able to make corrections to the claim detail information accordingly. In FIG. 16, the pre-validation claim detail information provides an alert that a certain screening is not allowed for the patient "Jones, Sara," because she is a female. After any updates to the claim details are finalized, the process 500 proceeds to step 550, where the claim is submitted to the payer via the assurance network 110, and returns.

It should be appreciated that, where pre-visit assurance of a claim or pre-validation of a claim is requested in connection with a non-participating payer, such as the non-participating payer 116, the assurance server 120 may query the database 124 instead of the non-participating payer 116 if the non-participating payer 116 has provided daily eligibility downloads for storage in the database 124, as described above. The eligibility information in the database 124 may include current costs for deductibles, out of pocket limits, etc.,—which, in combination with any exposed claims adjudication rules and assurance network "learned" rules, would provide a basis for the assurance server 120 to forward pre-visit assurance or claim pre-validation detail information to providers in substantially real time, even though the non-participating payer 116 is not itself queried. This synthetic adjudication offers flexibility for providing payment feedback even for non-participating payers.

It should further be appreciated that the communications in the methods 300 and 500 between providers, the assurance network 110 and the assurance server 120, and payers may be subject to transformations of data syntax and protocol, for example, when necessary for better integration. As one example, the method 300 may include transforming a data format of a pre-visit claim into a standard format. Similarly, the method 300 may include transforming a standard format of pre-visit claim detail information into a format for a provider's client interface device.

While embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

The invention claimed is:

1. An electronic exchange system for payment assurance and claim pre-validation, comprising:
   an assurance network including an assurance server,
   the assurance server further including;
      standard network interfaces, configured to facilitate the following communications directly between the assurance server and subscribing providers and subscribing payers to the assurance network;
      receive a pre-visit claim for health care related services from at least one subscribing provider,
      in response to the pre-visit claim, query at least one subscribing payer for pre-visit claim detail information, receive the pre-visit claim detail information from the at least one subscribing payer, the pre-visit claim detail information including indicators of one or more payment or authorization issues, receive a confirmation of an appointment for the health care related services from the at least one subscribing provider, in advance of the appointment, communicate updates to the payment or authorization issues from one or more of the at least one subscribing payers, and after the appointment, submit a claim for the health care related services administered during the appointment to the subscribing payer for adjudication of the claim in real time; and one or more translators for transforming data syntax and protocol and non-standard interfaces, configured to facilitate the following communications indirectly between the assurance server and at least one subscribing provider and at least one non-subscribing payer to the system;

receive a pre-visit claim for health care related services from a subscribing provider in a standard assurance network data format and translate by a translator the pre-visit claim into a non-standard assurance network data format, in response to the pre-visit claim, query at least one non-subscribing payer with the non-standard assurance network data format pre-visit claim message for pre-visit claim detail information, receive a pre-visit claim detail information from the at least one non-subscribing payer in the non-standard assurance network data format at the translator and translate the pre-visit claim information into the standard assurance network data format for the subscribing provider, the pre-visit claim detail information including indicators of payment or authorization issues, receive a confirmation message of an appointment for the health care related services from the subscribing provider in the standard assurance network data format and translate by the translator the confirmation message into a non-standard assurance network data format for the at least one non-subscribing payer, in advance of the appointment, communicate updates to the payment or authorization issues from the at least one non-subscribing payer to the subscribing provider, wherein the translator translates the at least one non-subscribing payers updates message from the non-standard assurance network data format to the standard assurance network data format for the subscribing provider, and after the appointment, receive a claim for the health care related services administered during the appointment and synthetically adjudicate the claim by the assurance network based on non-real time eligibility and adjudication data provided to the assurance network by the non-subscribing payer.

2. The system of claim 1, wherein the assurance server is further configured to query the non-subscribing payer for authorization of each line item of services rendered during the appointment, wherein a query to a non-subscribing payer is presented in the non-standard assurance network data format via the translator, in response to the query of each line item, receive pre-validation claim detail information from the non-subscribing payer, wherein the pre-validation claim detail information from the non-subscribing payer is presented to the subscribing provider in the standard assurance network data format via the translator, receive revisions to the claim based on the pre-validation claim detail information from the subscribing provider at the translator and translate revised claim to the non-standard assurance network data format, and synthetically adjudicate the claim by the assurance network based on non-real time eligibility and adjudication data provided to the assurance network by the non-subscribing payer.

3. The system of claim 2, wherein the pre-validation claim detail information includes an indicator of any line item errors or authorization issues associated with the submission of the claim.

4. The system of claim 2, wherein the assurance server is further configured to receive at a database thereof the non-real time eligibility and adjudication data, from the non-subscribing payer, including a preliminary schedule of services including services to be rendered, service codes for the services, and non-subscribing payer covered costs for the services, based on terms of a health care related insurance agreement, the service codes for the services and non-subscribing payer covered costs for the services serving as a basis for a mock claim.

5. The system of claim 2, wherein the assurance server is further configured to receive, from the non-subscribing payer, clinical information regarding a patient associated with the pre-visit claim for health related services, the clinical information including medical conditions of the patient, a care history of the patient, and health care related programs available to the patient.

6. The system according to claim 4, wherein the non-subscribing payer provides the non-real time eligibility and adjudication data on a daily basis.

7. The system according to claim 2, wherein the assurance server is configured to derive additional non-subscriber eligibility data from previous claim submissions and to apply this additional non-subscriber eligibility data during synthetic adjudication.

* * * * *